Patented Oct. 11, 1938

2,132,561

UNITED STATES PATENT OFFICE 2,132,561

AZO DYESTUFFS

Friedrich Felix and Jakob Scheidegger, Basel, Switzerland, assignors to Society of Chemical Industry in Basle, Basel, Switzerland No Drawing. Application January 22, 1936, Serial No. 60,351. In Switzerland January 29, 1935

17 Claims. (Cl. 260—198)

This invention relates to the manufacture of new dye-stuffs by coupling a diazo-compound of an amine of the benzene series in which a $SO_2R$-group stands in 4-position to the diazotized $NH_2$-group, wherein R stands for a substituent selected from the group consisting of aryl and aralkyl, with a component in which the group favoring the coupling is a substituted or non-substituted amino-group.

Depending on the choice of the coupling component and on the further substituents in the diazo-compound used, dye-stuffs are obtained which are suitable for dyeing animal fibres, or have a good affinity for esters and ethers of cellulose, for example acetate artificial silk. If the dyestuff obtained has at any position of the molecule a sulfonic acid group it is thereby rendered suitable for dyeing animal fibres or for printing acetate silk, while the dyestuffs which are sparingly soluble in water, for instance those which are free from sulfonic acid-groups, are particularly suitable for dyeing acetate silk. As sulfones of the kind in question there may be named 1-amino-benzene-4-methylsulfone, 1-aminobenzene-4-ethylsulfone, 1-amino-benzene-4-propylsulfone, 1-aminobenzene-4-butylsulfone, 1-aminobenzene-4-amylsulfone, 1-aminobenzene-4-benzylsulfone. There are further suitable sulfonic acids of these, for example, 1-aminobenzene-4-methylsulfone-2-sulfonic acid; also halogen compounds, for instance 1-aminobenzene-3-chlorobenzene-4-methylsulfone or 1-aminobenzene-4-para-chlorobenzylsulfone. Sulfones containing alkyl- or alkoxy-groups as substituents may also be used, for instance 1-amino-3-methoxybenzene-4-methysulfone. Among the coupling components suitable for making wool-dyestuffs there may be named, quite generally, amino- or amino-hydroxy-compounds of the benzene and naphthalene series which have the tendency to couple, or sulfonic acids thereof, for instance β-naphthylamine and its derivatives and substitution products, such as N-ethyl-β-naphthylamine and its sulfonic acids; further aminonaphtholsulfonic acids, for instance 2-amino-8-hydroxynaphthalene-6-sulfonic acid; also alkylanilinesulfonic acids, such as ethylbenzyl-anilinesulfonic acid. For dyeing acetate silk suitable dyestuffs are, in particular, obtained by using diazo-components of the aforesaid kind which contain no sulfonic acid groups and as coupling components simple aromatic bases, for instance aniline or its homologues and analogues. There may be used, therefore, aniline, ortho- or meta-toluidine, para-xylidine, paracresidine, 2,5-dialkoxy-aminobenzene, naphthylamines, aminonaphthols, and then the amines alkylated or hydroxyalkylated in the amino group, and further such hydroxyalkylated amines as may be etherified or esterified in the hydroxy-group. The properties of fastness and the tints of the materials treated with these dyestuffs are widely varied by the choice of the substituents.

The new dyestuffs correspond therefore to the general formula

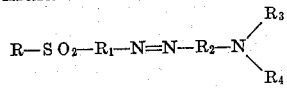

in which R stands for a substituent selected from the group consisting of alkyl and aralkyl, $R_1$ stands for a nucleus of the benzene series wherein the $R-SO_2$-group and the —N=N-group stand in para-position to each other, $R_2$ stands for an aromatic nucleus of the benzene or naphthalene series, in which the —N=N-group stands in 2- or 4-position to the

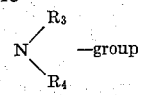

-group $R_3$ stands for a member selected from the group consisting of hydrogen, alkyl, aralkyl or aryl, and $R_4$ stands for a member selected from the group consisting of hydrogen, alkyl or aralykyl. In a dry state the new dyestuffs are dark powders dissolving in pyridine to yellow to red and violet solutions and dyeing the fiber similar tints.

While the dyestuffs containing sulfonic acid groups dye wool in an acid bath, the insoluble dyestuffs which are suitable for dyeing acetate artificial silk are preferably first brought into finely dispersed form. This may be done by grinding with the usual dispersing agents, for instance sulfite cellulose liquor, sulfonated residues of the benzaldehyde manufacture or the like. By cautiously drying such pastes, particularly suitable dyestuff preparations are obtained.

Depending on the selection of the components dyestuffs are obtained which dye the said materials yellow to red and blue-red tints. These dyestuffs, particularly in the case of dyeing wool, are characterized by the excellent fastness to light and good fastness to washing of the dyeings obtained. They are suitable, however, in quite a remarkable degree for making mixed dyeings, because they have a quite pronounced levelling capacity.

The new dyestuffs may also be used for dyeing lacquers, varnishes and artificial masses, such as nitrocellulose lacquers, acetyl cellulose lacquers, formaldehdye-urea resins and formaldehyde-phenol resins, respectively, there being obtained similar tints as on the fiber.

The following examples illustrate the invention, the parts being by weight:—

Example 1

171 parts of 1-aminobenzene-4-methylsulfone are diazotized in hydrochloric acid solution in the usual manner with 69 parts of sodium nitrite. Into this diazo-solution there is run in drops a neutral solution of 239 parts of 2-amino-8-hydroxy-naphthalene-6-sulfonic acid. The mixture is stirred until the coupling, which may be accelerated if desired by cautious addition of an acid binding agent or a buffering agent, is completed. The solution is then made neutral and the dyestuff of the formula

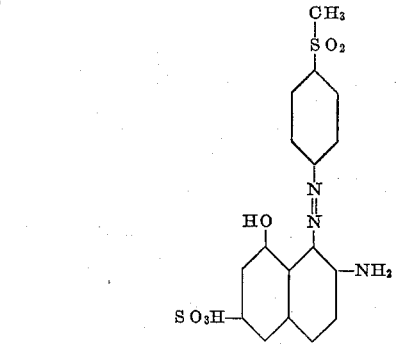

precipitated by addition of sodium chloride and then dried. It has an excellent levelling capacity and dyes wool yellowish-red tints of a high degree of fastness to light.

The procedure is similar in making a dyestuff from diazotized 1-aminobenzene-4-methylsulfone and ethylbenzylanilinesulfonic acid; the dyestuff dyes a yellow-orange tint. By coupling the same diazo-compound with 2-aminonaphthalene-6-sulfonic acid there is also obtained a product which dyes orange.

Example 2

185 parts of 1-aminobenzene-4-ethylsulfone are diazotized in hydrochloric acid solution in the usual manner with 69 parts of sodium nitrite. Into this diazo-solution there is run, in drops, a neutral solution of 239 parts of 2-amino-8-hydroxy-naphthalene-6-sulfonic acid. The mixture is stirred until the coupling, which may be accelerated if desired by careful addition of an acid binding or buffering agent, is complete. The solution is neutralized and salted out, whereupon the dyestuff of the formula

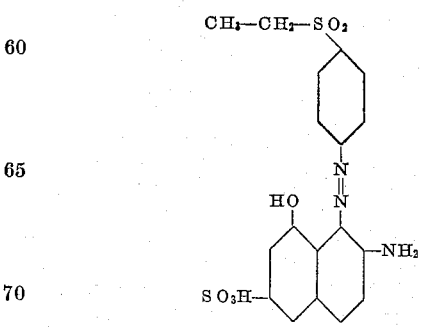

is filtered and dried. It dyes wool red tints which are very level. A similar dyestuff is formed from the 1-aminobenzene-4-propylsulfone.

If instead of the 2-amino-8-hydroxynaphthalene-6-sulfonic acid there is used the 2-aminonaphthalene-6-sulfonic acid, a dyestuff that dyes reddish-yellow is obtained.

If instead of the 2-amino-8-hydroxynaphthalene-6-sulfonic acid there is used the 2-phenylamino-8-hydroxynaphthalene-6-sulfonic acid there is obtained a dyestuff which dyes wool brownish-Bordeaux and is of otherwise similar properties.

Example 3

247 parts of 1-aminobenzene-4-benzylsulfone are diazotized in hydrochloric acid suspension with 69 parts of sodium nitrite. To the diazo-solution there is added, in drops, a neutral solution of 239 parts of 2-amino-8-hydroxynaphthalene-6-sulfonic acid. When coupling is complete, the dyestuff of the formula

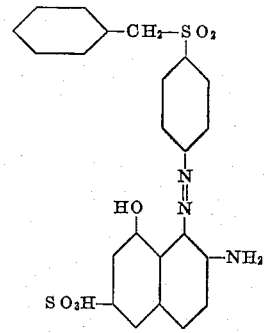

is filtered and dried. It dyes wool red tints of a high degree of fastness to light and washing and is characterized by a good levelling capacity.

By using the diazo-compound from a sulfone halogenated in the benzyl nucleus there is obtained a dyestuff which has similar dyeing properties.

Example 4

205 parts of 1-amino-3-chlorobenzene-4-methylsulfone are diazotized in hydrochloric acid suspension with 69 parts of sodium nitrite. Into the filtered diazo-solution there is run a neutral solution of 223 parts of 2-aminonaphthalene-6-sulfonic acid. The dyestuff of the formula

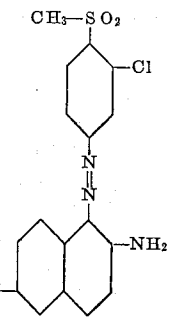

separated after the coupling is complete dyes wool orange tints of high degree of fastness to light and is characterized by a good levelling capacity.

If the 2-ethylaminonaphthalene-6-sulfonic acid is used instead of the 2-aminonaphthalene-6-sulfonic acid there is obtained a dyestuff which dyes wool bluish-red tints.

The 1-amino-3-chlorobenzene-4-methylsulfone used in this example may be made as follows: 1,2-dichloro-4-nitrobenzene is converted by reaction with sodium disulfide into 2,2'-dichloro-4,4'-dinitro-diphenyldisulfide, which is reduced to the corresponding thiophenol and then methylated to produce the methylthioether. The latter is now oxidized, for example with hydrogen peroxide, to produce 1-chloro-3-nitrophenyl-6-methylsulfone which may be reduced by known methods to 1-amino-3-chlorobenzene-4-methylsulfone.

Orange dyeing dyestuffs may also be obtained by using 1-amino-3-methoxybenzene-4-methylsulfone instead of 1-amino-3-chlorobenzene-4-methylsulfone.

Example 5

251 parts of 1-aminobenzene-4-methylsulfone-2-sulfonic acid in suspension in hydrochloric acid are diazotized by means of 69 parts of sodium nitrite. To the suspension of the sparingly soluble diazo-compound are added 171 parts of 2-ethylamino-naphthalene in the form of a suspension of its sulfate. When coupling is complete and the mass has been neutralized there is obtained a dyestuff of the formula

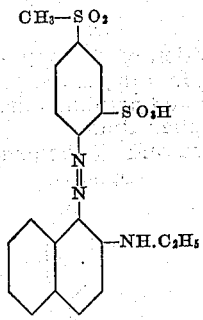

which dyes wool blue-red tints of a high degree of fastness to light and of good levelling capacity.

A dyestuff of similar dyeing properties is obtained when using 2-benzylamino-naphthalene instead of 2-ethylamino-naphthalene.

Example 6

171 parts of 1-aminobenzene-4-methylsulfone are diazotized in the usual manner by means of 69 parts of sodium nitrite. To this solution there is added in drops an aqueous solution of 137 parts of 1-amino-2-methoxy-5-methylbenzene and the necessary quantity of hydrochloric acid. When coupling is complete, which may be hastened by the addition of sodium acetate, the dyestuff is filtered and washed until neutral. It is an orange powder of the formula

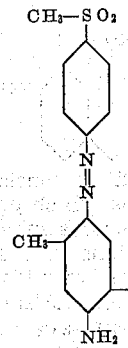

which when finely dispersed dyes acetate silk fast gold-yellow tints.

When using higher alkylated sulfones, such as 1-aminobenzene-4-ethylsulfone, 1-aminobenzene-4-propylsulfone or 1-aminobenzene-4-amylsulfone instead of 1-aminobenzene-4-methylsulfone, dyestuffs of similar dyeing properties are obtained.

If instead of 1-amino-2-methoxy-5-methylbenzene the 1-amino-2,5-dimethoxybenzene, the ethylbenzylaniline or the diphenylamine is used there is obtained a dyestuff which dyes acetate silk somewhat more reddish tints.

Yellow-dyeing dyestuffs are obtained by using as coupling components such compounds as 1-amino-3-methylbenzene. In making dyestuffs from aniline or 1-amino-2-methylbenzene it is of advantage to allow the diazo-compound to act upon the formaldehyde bisulfite compound of the coupling component and to treat the dyestuff afterwards with acid or alkali. The dyestuffs from N-alkylated amines, for instance ethyl-hydroxyethylaniline or ethyl-methoxyethylaniline dye acetate silk reddish-yellow to orange tints.

The dyestuffs from 1-amino-benzene-4-methylsulfone and α- or β-naphthylamines dye lacquers yellow-orange to scarlet-red tints.

Example 7

2.5 parts of the dyestuff obtained as described in Example 1 are dissolved in 1000 parts of boiling water. The dye-bath is prepared with 2500 parts of water of 50–60° C., whereupon the dissolved dyestuff is added, and is followed by 500 parts of water rinsings. To the dye-bath containing the 4000 parts of liquor there are added 10 parts of crystallized sodium sulfate, 100 parts of wool are entered at 50–60° C. and then 40 parts of sulfuric acid of 10 per cent strength are added. The contents of the bath are gradually heated to 85–90 C. and dyeing is continued at this temperature. The finishing operation is as usual; the result is a very pure red dyeing of excellent properties of fastness.

Example 8

10 parts of the dyestuffs described in Example 6 are stirred to form a uniform paste containing 20 per cent of the dyestuff in a suitable dispersing agent, for instance Turkey red oil, sulfite cellulose solution, sulfonation products of the residue of the benzaldehyde manufacture. 1 part of this paste is mixed very intimately with 10 parts of water of 50° C. and enough concentrated soap solution to make the bath correspond with a soap solution of 0.2 per cent. strength. Dilution to about 300 parts with cold water follows: In the emulsion thus prepared there are immersed 10 parts of acetate silk yarn and, while handling, the bath is heated within ¾ hour to 75° C. and dyeing is continued for about ¼ hour at this temperature. Rinsing and brightening follow as usual. There are obtained vivid reddish-yellow dyeings.

What we claim is:—

1. The azo-dyestuffs of the general formula

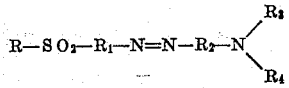

in which R stands for a substituent selected from the group consisting of alkyl and aralkyl, $R_1$ stands for a nucleus of the benzene series wherein the R—SO2—group and the—N=N—group stand in para position to each other, $R_2$ stands for a member selected from the group consisting of an aromatic nucleus of the benzene and naphthalene series in which the 1-position is occupied by the —N=N— group and in which, of the 2- and 4-positions, one is occupied by an H-atom and the other by the

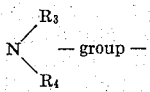

$R_3$ stands for a member selected from the group consisting of hydrogen, alkyl, aralkyl and aryl, and R4 stands for a member selected from the group consisting of hydrogen, alkyl and aralkyl, which products, in a dry state, are dark powders, soluble in pyridine to yellow, orange, red and violet solutions, and dyeing lacquers and the fiber similar tints.

2. The azo-dyestuffs of the general formula

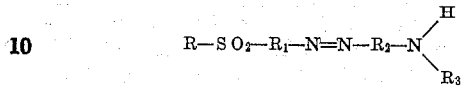

in which R stands for a substituent selected from the group consisting of alkyl and aralkyl, R₁ stands for a nucleus of the benzene series wherein the R—SO₂— group and the —N═N— group stand in para-position to each other, R₂ stands for a nucleus of the naphthalene series in which the 1-position is occupied by the —N═N— group and in which, of the 2- and 4-positions, one is occupied by an H-atom and the other by the

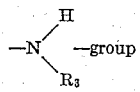

and R₃ stands for a member selected from the group consisting of hydrogen, alkyl, aralkyl and aryl, which products, in a dry state, are dark powders, soluble in pyridine to yellow to red and violet solutions, and dyeing the fiber similar tints.

3. The sulfonated azo-dyestuffs of the general formula

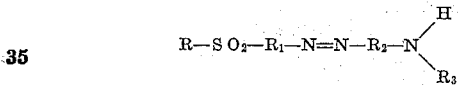

in which R stands for a substituent selected from the group consisting of alkyl and aralkyl, R₁ stands for a nucleus of the benzene series wherein the R—SO₂— group and the —N═N— group stand in para-position to each other, R₂ stands for a nucleus of the napththalene series in which the 1-position is occupied by the —N═N— group and in which, of the 2- and 4-positions, one is occupied by an H-atom and the other by the

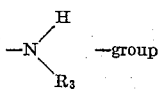

and R₃ stands for a member selected from the group consisting of hydrogen, alkyl, aralkyl and aryl, which products, in a dry state, are dark powders, soluble in water and pyridine to yellow to red and violet solutions, and dyeing wool similar tints.

4. The azo-dyestuffs of the general formula

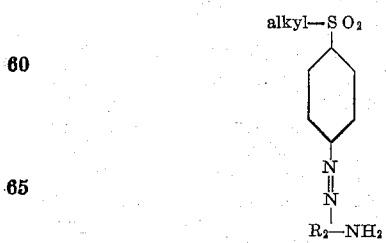

in which R₂ stands for a sulfonated naphthalene nucelus and in which the —N═N— group stands in the 1-position of the napththalene nucleus and the NH₂ group stands in 2-position of the naphthalene nucleus, which products, in a dry state, are dark powders, soluble in water and pyridine to red solutions and dyeing wool similar tints.

5. The azo-dyestuffs of the general formula

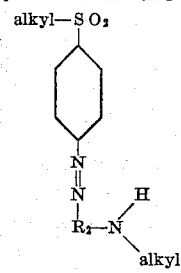

in which R₂ stands for a sulfonated naphthalene nucleus and in which the —N═N— group stands in the 1-position of the naphthalene nucleus and the

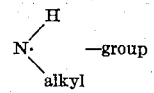

stands in 2-position of the naphthalene nucleus, which products, in a dry state, are dark powders, soluble in water and pyridine to red solutions and dyeing wool similar tints.

6. The azo-dyestuffs of the general formula

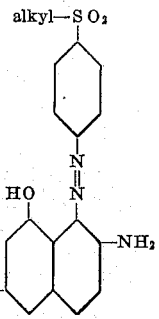

which products, in a dry state, are dark powders, soluble in water and pyridine to red solutions and dyeing wool red tints which are level and very fast to light.

7. The azo-dyestuffs of the general formula

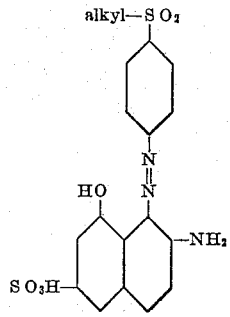

wherein the alkyl radical consists of not more than two carbon atoms, which products, in a dry state, are dark powders, soluble in water and pyridine to red solutions and dyeing wool red tints which are level and very fast to light.

8. The azo-dyestuff of the formula

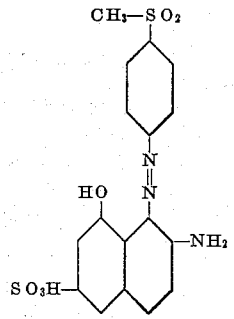

which products, in a dry state, is a dark powder soluble in water and pyridine to a red solution and dyeing wool red tints which are level and very fast to light.

9. The azo-dyestuffs of the general formula

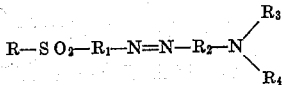

in which R stands for a substituent selected from the group consisting of alkyl and aralkyl, $R_1$ stands for a radical of the benzene series wherein the $R$—$SO_2$— group and the —N=N— group stand in para-position to each other, $R_2$ stands for a radical of the benzene series wherein the —N=N— group and the

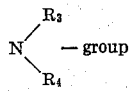

stand in para-position to each other, $R_3$ stands for a member selected from the group consisting of hydrogen, alkyl, aralkyl or aryl, and $R_4$ stands for a member selected from the group consisting of hydrogen, alkyl or aralkyl, which products, in a dry state, are dark powders, soluble in water and pyridine to yellow to orange solutions, and dyeing lacquers, wool and acetate artificial silk similar tints.

10. The azo-dyestuffs of the general formula

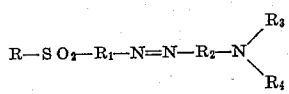

in which R stands for alkyl, $R_1$ stands for a radical of the benzene series wherein the $R$—$SO_2$— group and the —N=N— group stand in para-position to each other, $R_2$ stands for a radical of the benzene series wherein the —N=N— group and the

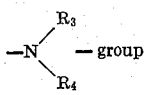

stand in para-position to each other, $R_3$ stands for a member selected from the group consisting of hydrogen, alkyl, aralkyl and aryl, and $R_4$ stands for a member selected from the group consisting of hydrogen, alkyl and aralkyl, which products, in a dry state, are dark powders, soluble in water and pyridine to yellow to orange solutions, and dyeing lacquers, wool and acetate artificial silk similar tints.

11. The unsulfonated azo-dyestuffs of the general formula

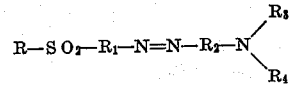

in which R stands for alkyl, $R_1$ stands for a radical of the benzene series wherein the $R$—$SO_2$— group and the —N=N— group stand in para-position to each other, $R_2$ stands for a radical of the benzene series wherein the —N=N— group and the

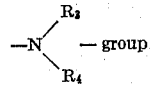

stand in para-position to each other, $R_3$ stands for a member selected from the group consisting of hydrogen, alkyl, aralkyl and aryl, and $R_4$ stands for a member selected from the group consisting of hydrogen, alkyl and aralkyl, which products, in a dry state, are dark powders, soluble in pyridine to yellow to orange solutions, and dyeing lacquers and acetate artificial silk similar tints.

12. The unsulfonated azo-dyestuffs of the general formula

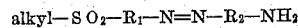

in which the alkyl of the alkyl—$SO_2$ group contains not more than two carbon atoms, $R_1$ stands for a radical of the benzene series wherein the alkyl—$SO_2$ group and the —N=N— group stand in para-position to each other, and $R_2$ stands for a radical of the benzene series wherein the —N=N— group and the $NH_2$ group stand in para-position to each other, which products, in a dry state, are dark powders, soluble in pyridine to yellow to orange solutions, and dyeing lacquers and acetate artificial silk similar tints.

13. The unsulfonated azo-dyestuffs of the general formula

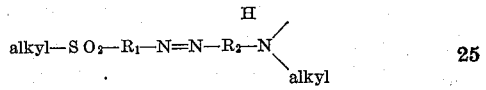

in which the alkyl of the alkyl—$SO_2$ group contains not more than two carbon atoms, $R_1$ stands for a radical of the benzene series wherein the alkyl—$SO_2$ group and the —N=N— group stand in para-position to each other, and $R_2$ stands for a radical of the benzene series wherein the —N=N— group and the

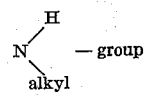

stand in para-position to each other, which products, in a dry state, are dark powders, soluble in pyridine to yellow to orange solutions, and dyeing lacquers and acetate artificial silk similar tints.

14. The unsulfonated azo-dyestuff of the formula

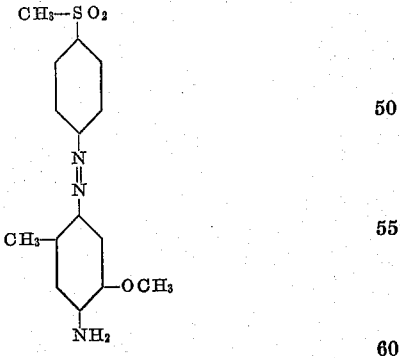

which product, in a dry state, is a dark powder soluble in pyridine to a red-yellow solution and dyeing acetate artificial silk similar tints.

15. Water-insoluble azo-dyestuffs having the general formula

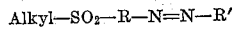

in which R represents the benzene nucleus of a diazotized aminobenzene wherein the alkyl—$SO_2$— group and the azo group stand in para-position to each other and R' represents a radical of an aromatic amine coupling component selected from the group consisting of aminobenzenes and aminonaphthalenes, which has been coupled in para-position to the amino group.

16. Water-insoluble azo-dyestuffs having the general formula
wherein R' represents a radical of an aromatic amine coupling component selected from the group consisting of aminobenzenes and aminonapththalenes, which has been coupled in para-position to the amino group.
17. The water-insoluble azo-dyestuffs having the formula
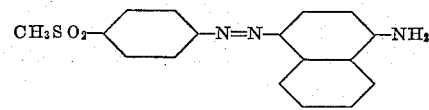
FRIEDRICH FELIX.
JAKOB SCHEIDEGGER.